Oct. 23, 1962 W. VAN DER SLUYS 3,059,974
BRAKE SYSTEM WITH FLUID PRESSURE SPRING CONTROL
Filed June 22, 1956 5 Sheets-Sheet 4

INVENTOR.
William Van Der Sluyer,
BY
Cromwell, Greist & Warden

United States Patent Office 3,059,974
Patented Oct. 23, 1962

3,059,974
BRAKE SYSTEM WITH FLUID PRESSURE
SPRING CONTROL
William Van Der Sluys, Homewood, Ill., assignor to Pullman-Standard Car Manufacturing Company, Chicago, Ill., a corporation of Delaware
Filed June 22, 1956, Ser. No. 593,064
2 Claims. (Cl. 303—22)

The present invention relates generally to improved brake systems for use in vehicles, which brake systems are particularly adapted for use with trailer-type vehicles wherein the weight of the load constitutes a large percentage of the total operating weight. More specifically, the present invention is directed to an improvement in a brake system used with a vehicle, the body of which is supported by fluid pressurized diaphragm springs, the brake system utilizing the fluid pressure of the springs to provide variable braking action corresponding to variations in the total weight of the vehicle as established by the load carried thereby.

In the operation of trailer-type or articulated vehicles, such as railway cars and truck trailers, the freight or passenger load often accounts for a large percentage of the total weight of the car or trailer. This is particularly true with the development of lightweight, high speed passenger railway cars where the empty weight of each car is designed at a minimum and the total passenger weight amounts to a large percentage of the total operating weight. The brake system used in this type of vehicle is normally pneumatically or electro-pneumatically operated and the total braking action necessary to safely and comfortably stop a number of articulated vehicles will vary with the total load carried thereby. Existing braking systems are applied by the operator of the train or trailer-truck and the extent to which the brakes are applied is dependent upon the operator's knowledge of the total load carried by the articulated vehicles in combination with his judgment resulting from personal experience. In freight train or passenger train operation it is impractical to load each of the interconnected cars to the same extent so that each of the cars of the train weighs exactly, or even approximately, the same throughout the entire train. Consequently, the preferred situation would be that each car is braked to a degree corresponding to the total weight of the same and independently of the remaining cars of the train. It has not been proven practical to individually brake each of the cars from a central location and, while efforts have been made to provide automatic braking systems which function to brake each separate car to an extent related to the total weight of the car, no system has been developed which has been found to be practical from the standpoint of operation or cost.

Under full load each individual freight or passenger car or trailer requires greater braking action to bring the same to a complete stop within a specified safe distance. When these cars or trailers are empty the braking action necessary is materially reduced. In freight train make-up it is often the case that some of the cars are fully or partially loaded while others are completely empty. As a result, the braking action necessary throughout the entire length of a freight train will vary considerably with each individual car. Consequently, it has been considered desirable to provide each of the cars with a brake system control means which will regulate the braking action provided each individual car in conformance with the weight of the car. A control of this nature should make use of the braking force supplied by the trainlined braking system to an extent that meets the requirements of the individual car in order to bring the same to a complete stop simultaneously with the rest of the train within the distance desired by the operator of the train. A system of this nature allows each of the individual cars to be braked in accordance with their separate requirements and overbraking or under-braking will not occur.

It is an object of the present invention to provide an improved brake system particularly adapted for use with vehicles wherein the applied load constitutes a large percentage of the vehicle weight when empty, the vehicle body being supported by fluid pressurized diaphragm springs, the pressure carried thereby being automatically regulated in response to variations in load, the brake system being operatively associated with the pressure carried by the diaphragm springs to control the application of braking action to the vehicle in response to vehicle load.

Another object is to provide an improved braking system, the improvement including the use of air spring pressure which is variable in response to the applied load of the vehicle, the air spring pressure functioning with the brake system to control the braking action provided the individual vehicle in line with the specific weight of the vehicle at the time of the application of the brakes, this improvement resulting in the provision of braking action of a magnitude corresponding to the total weight of the vehicle, the variations in the braking action applied being automatically obtained.

A further object is to provide an improved brake system particularly adapted for use with trains wherein the system extends through a plurality of interconnected cars forming the train and is operated by the engineer in the locomotive of the train, the operation of the system providing a braking force of equal magnitude to each of the interconnected cars and the components of the braking system carried in each of the individual cars being interconnected with car-body supporting air springs the internal pressure of which controls the amount of braking force taken from the main system and utilized in braking the individual car, the air spring pressure corresponding to the weight of the individual car independent of the weight of the remaining cars and functioning to control the braking force applied to the car in response to the load carried by the car thereby allowing each of the cars to be independently braked in accordance with their individual requirements to bring the train to a complete stop in an efficient and safe manner.

Other objects not specifically set forth will become apparent from the following detailed description made in conjunction with the drawings wherein.

While the following description of the present invention deals solely with improved brake systems for use with trains formed from railway cars, it should be understood that the principles of the present invention may be followed in improving many different forms of brake systems for use with different types of vehicles. The improvement of the present invention resides in the utilization of fluid pressure carried by a load-responsive means, such as an air spring used in supporting a vehicle body in predetermined vertically spaced relation with a wheel-carrying axle, as a control in the operation of a brake system to regulate the braking force applied to the wheels or axle in direct relation with the total weight of the load carried by the vehicle. Many different forms of braking systems are susceptible of being improved in accordance with the principles of the present invention and the following description deals with one such system particularly adapted for use in trains formed from a plurality of interconnected railway cars. However, electrically, pneumatically, electro-pneumatically, electrohydraulically or hydraulically operated brake systems may be improved by the inclusion of the braking ratio control of the present invention and an improvement of this nature, such as for example in the brake system of a trailer-truck, is intended to fall within the scope of the present invention.

The brake system to be described in connection with FIGS. 1 and 2 has been found to be particularly useful in lightweight, high speed trains formed from a plurality of interconnected single axle railway cars. The single axle cars are designed with a low center of gravity and the car bodies are mounted on the single axles by suspension systems which utilize air springs formed from outer flexible diaphragms internally provided with pressurized air capable of maintaining the car body at a predetermined vertical relation with respect to the axle regardless of the load carried thereby. The single axle of each car is positioned at one of the ends of the car body to provide a wheel-supported end, the remaining end of the car body being coupler-supported in cooperation with an adjacent wheel-supported end of another car. Consequently, the air springs of the suspension system of each car not only support a portion of the weight of the car body carried thereby but further support a portion of the weight of an adjacent car having its coupler-supported end interconnected therewith.

Lightweight, railway cars of this nature have been developed particularly for passenger service and, when fully loaded, the passenger weight of the car constitutes a large percentage of the total weight of the car. Consequently, the total weight of the car varies considerably with variations in passenger load. The air springs of the suspension system are supplied with pressurized air from a suitable source, such as the brake system, the air being automatically fed to the springs or bled therefrom by leveling valves forming a part of the suspension system. Upon the loading of the car with passengers, the car body will compress the air springs and move downwardly toward the axle in response to increasing load. The leveling valves are arranged to automatically feed air into the air springs upon downward movement of the car body until the pressure carried by the air springs is increased sufficiently to re-attain the vertical positioning of the car body relative to the axle. Upon the unloading of passengers and an accompanying decrease in weight, the car body has a tendency to move vertically upwardly away from the axle in response to the air pressure carried by the air springs. The leveling valves operate automatically under these circumstances to bleed the air springs of excess pressure thereby allowing the car body to return to its original position relative to the axle. Consequently, the car body is automatically leveled under varying conditions and the air pressure carried by the air springs corresponds to the passenger load carried by the car. An air spring suspension system of this type is fully disclosed in the copending application of James E. Candlin, Jr., Serial No. 571,869, filed March 16, 1956, now Patent No. 2,912,234 issued November 10, 1959.

Figure 1:
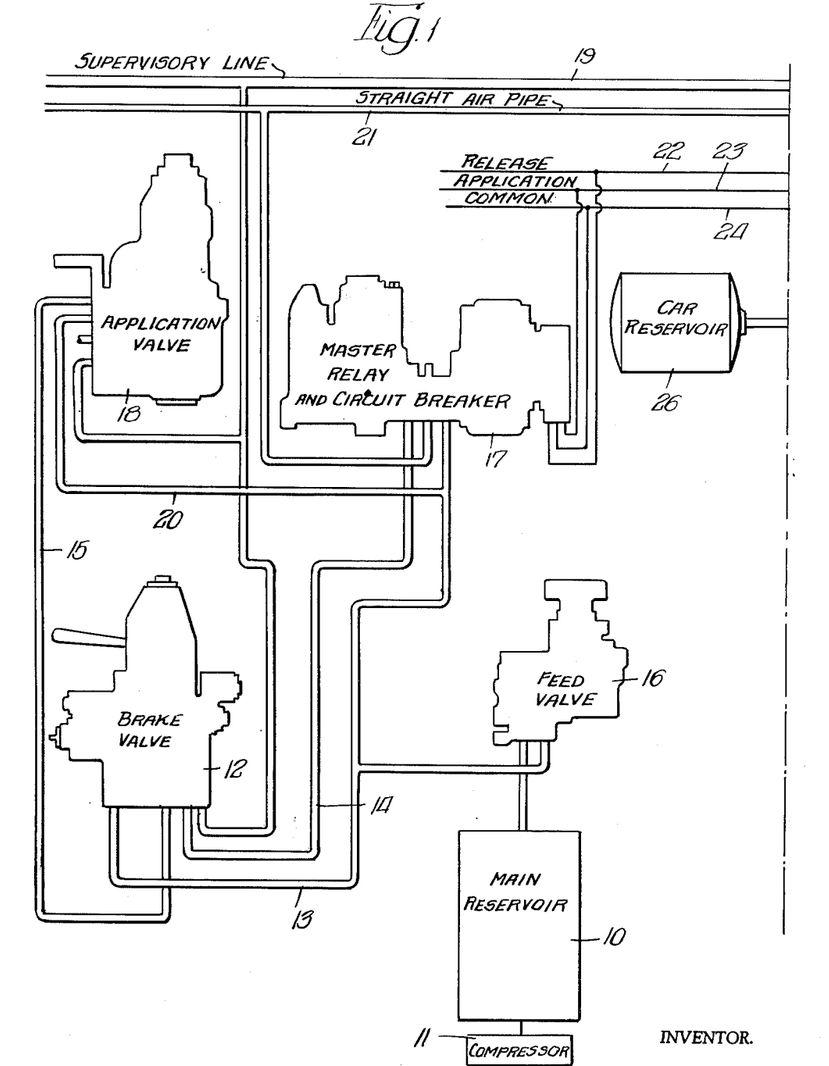
FIGS. 1 and 2 combined contitute a diagrammatic showing of one form of brake system particularly adapted for improved functioning in accordance with the principles of the present invention.
Figure 2:
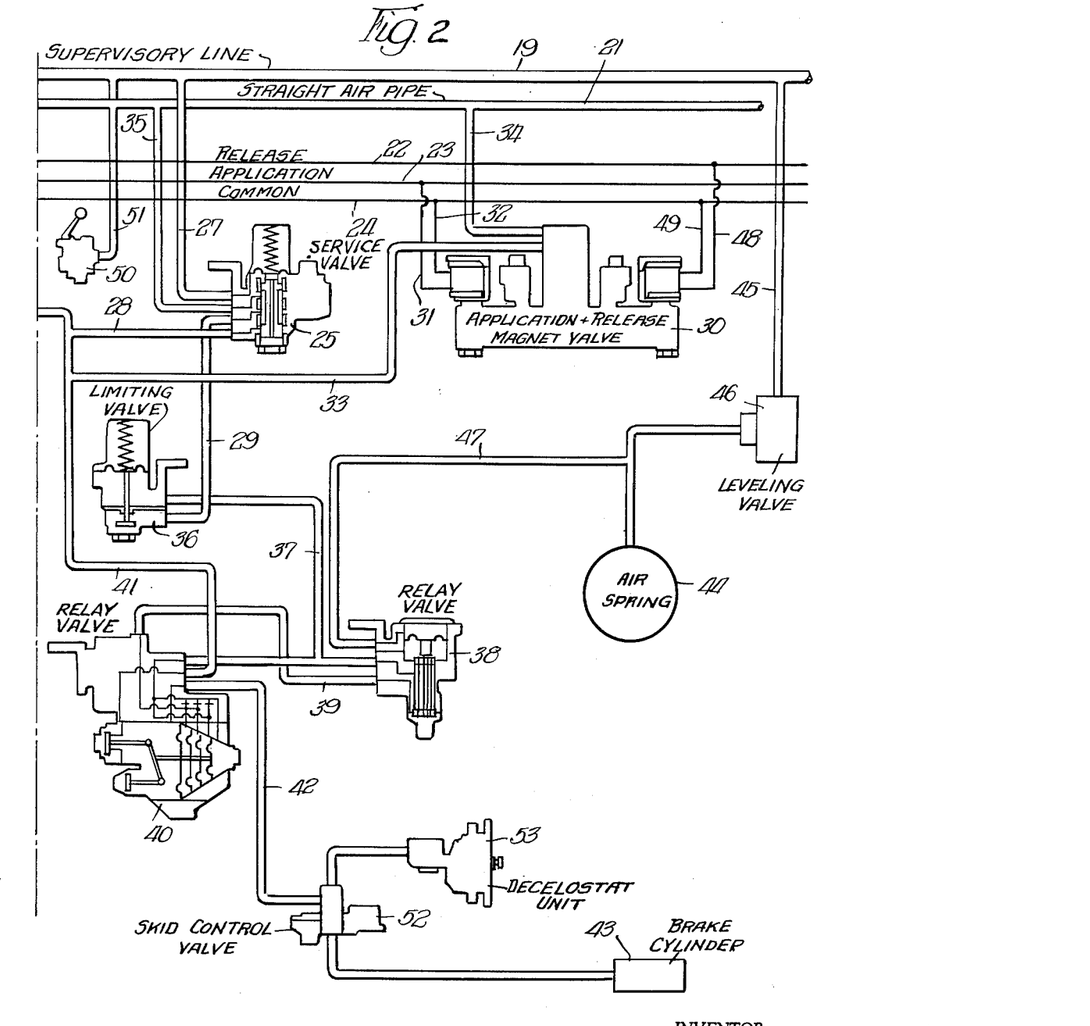

Referring to FIGS. 1 and 2, one form of improved brake system is diagrammatically shown. This system incorporates therein a known system which is made available by the New York Air Brake Company of New York, New York. The known system is commonly referred to as an electro-pneumatic system which utilizes electrical and pressure operated controls, the electrical controls being added to the system to provide instantaneous response of the separate brake operating units carried by each of the railway cars thereby allowing efficient and safe operation in a long train. Each of the valves forming a part of the system is readily available and is well known as to its manner of functioning. Consequently, the following description of the operation of the system including these valves will be concise, it being understood that any suitable valve capable of providing the type of action described may be readily used in a brake system of this nature.

The locomotive of the train, from which the control of the brake system is normally initiated, includes a main reservoir 10 of pressurized air maintained at full capacity by an air compressor 11. The engineer operates the brake system by handle operation of a brake valve 12 which is a self-lapping type of valve, the position of the handle determining the extent of braking occurring in the train. The valve 12 is generally identified as an LWL Brake Valve and is connected through air lines 13, 14 and 15 with a feed valve 16, a master relay valve and circuit breaker 17 and an application valve 18, respectively. The feed valve 16 is identified as an F–6–MD Feed Valve and functions to reduce fluctuating main reservoir pressure to the predetermined desired pressure carried by a supervisory line 19 which extends from the application valve 18 the full legth of the train. The feed valve 16 is interconnected with the application valve 18 through an air line 20. Extending from the master relay valve and circuit breaker 17 is a straight air pipe 21 which extends the full length of the train and, in combination with the supervisory line 19, controls the functioning of the individual brake units and their associated control means positioned in each of the cars of the train. The master relay valve and circuit breaker 17 is further provided with a release wire 22, an application wire 23 and a common wire 24, each of the wires being trainlined throughout the train and forming the electrically functioning portion of the brake system.

The brake valve 12 may be operated to apply the brakes on each of the cars throughout the train to a degree desired by the engineer and the extent to which the brakes are applied is additionally governed by the functioning of air spring pressure in each of the cars. Air pressure of approximately 110 p.s.i. is maintained in the supervisory line 19 at all times by the feeding of air from the main reservoir 10 through the feed valve 16 and application valve 18. The supervisory line 19 functions primarily as a safety line in the brake system and upon a drop in pressure in the line due to leakage or another form of failure in the system, the braking units are automatically applied as will subsequently be described. The brake valve 12 is provided with brake, release and emergency positions, the latter of which causes the application valve 18 to exhaust the supervisory line 19 thereby causing immediate application of the brakes throughout the train.

To apply the brakes during normal operation, the brake valve 12 is operated by the engineer by movement of the operating handle to a position which will supply the degree of braking action desired. Movement of the handle causes the master relay valve and circuit breaker 17 to energize the application wire 23 and admit air from the main reservoir 10 through the feed valve 16 and master relay valve 17 into the straight air pipe 21. The common wire 24 completes the circuit of the electrical portion of the brake system and the straight air pipe 21 is normally exhausted when the brakes are fully released. In order to apply the brakes, it is necessary to introduce pressurized air into the straight air pipe 21 in the manner described. When the straight air pipe pressure reaches the value called for by the position of the handle of the brake valve 12, the master relay valve and circuit breaker 17 de-energizes the application wire 23 and shuts off flow of air from the main reservoir 12 into the straight air pipe 21 except to the extent necessary to maintain the desired braking air pressure.

With air admitted into the straight air pipe 21, the braking units and control means carried by each of the interconnected railway cars are energized to provide braking action as called for by the magnitude of air pressure carried by the straight air pipe 21. Each of the cars includes the control elements of the system now to be described and in FIGS. 1 and 2 only one control system is shown, it being understood that each of the cars carries a similar set of controls.

Each car includes a service valve 25 which interconnects the supervisory line 19 with a car air reservoir 26. As previously described, the supervisory line 19 carries an air pressure of approximately 110 p.s.i. and the service valve 25 permits air to flow from the supervisory line 19 through air lines 27 and 28 into the car air reservoir 26 at all times, except during periods of emergency brake application as will be described, to maintain the air pressure of the car reservoir 26 at substantially 110 p.s.i. Thus, the supervisory line 19 serves an additional function of replenishing the air supply of the car reservoir 26, the air supply of the reservoir 26 being used during periods of brake application. The service valve 25 is provided with a non-return check valve portion controlling flow of air from the supervisory line 19 to the car reservoir 26. This valve further functions during an emergency application of the brakes initiated by a drop in air pressure in the supervisory line 19 to pass a controlled amount of air directly from the car reservoir 26 through the lines 28 and 29 to further valves controlling the operation of the braking units. On emergency application of this nature, the service valve 25 functions to permit the brakes to apply as a straight pneumatic system.

Upon normal electro-pneumatic braking application as previously described wherein the application wire 23 is energized and air is introduced into the straight air pipe 21, an application and release magnet valve 30 is actuated. The valve 30 is provided with separate application and release magnet valves which are operated directly by the trainlined wires 22, 23 and 24. The application magnet valve portion is connected to the application and common wires 23 and 24 through wires 31 and 32 and, upon energization of this magnet valve portion, air is allowed to flow through an air line 33 from the car reservoir 26 and into the straight air pipe 21 through an air line 34. Introduction of air into the straight air pipe 21 occurs in each of the cars simultaneously in response to electrical energization of the application magnet valve portion forming a part of the unit 30. Consequently, the air pressure in the straight air pipe 21 builds up immediately as the pipe 21 is fed with air from each of the car reservoirs 26. The control pressure desired to provide a predetermined amount of braking action develops immediately and upon reaching the predetermined pressure, as determined by the position of the operating handle of the brake valve 12, the supply of air from the main reservoir 10 into the straight air pipe 21 is shut off. Simultaneous with the shutting off of the supply of air from the main reservoir 10 into the straight air pipe 21, the application wire 23 is de-energized and the air pressure developed in the straight air pipe 21 is maintained and braking continues to an extent equal to this pressure. Normal braking pressure carried by the straight air pipe 21 will vary from about 0 to 50 p.s.i.

To actuate the brake units of each individual car, the air pressure carried by the straight air pipe 21 is fed through the service valve 25 by an air line 35, through the line 29, a limiting valve 36, an air line 37, a relay air valve 38 and an air line 39 into a relay valve 40. The valve 40 is of known type being readily available from New York Air Brake Company of New York, New York, and identified as Part No. N7922. The pressure carried by the line 39 into the relay valve 40 controls the amount of air delivered from the car reservoir 26 through a line 41, through the relay valve 40, and a line 42 into the brake cylinders 43 to ultimately cause application of the brakes. In other words, direct braking action is caused by the delivery of air from the car reservoir 26 through the line 41, valve 40 and line 42 into the brake cylinders 43. The air pressure brought from the straight air pipe 21 through the valves 25, 36 and 38 is a control pressure which functions in the valve 40 to control the amount of air pressure passing from the car reservoir 26 into the brake cylinders 43. The pressure allowed to pass through the valve 40 from the car reservoir 26 is generally proportional to the pressure carried by the line 39.

The limiting valve 36 controls the air pressure passed to the brake cylinders 43 at all times even under emergency conditions regardless of piston travel at the brake cylinders 43. The limiting pressure is about 80 p.s.i. The relay air valve 38, normally identified as an H–5 valve, acts to reduce the brake cylinder pressure under certain conditions to be described.

In addition to supplying air to the car reservoir 26, the supervisory line 19 also supplies air to the air springs 44 through a line 45 which has interposed therein a leveling valve 46. The valve 46 functions to maintain constant height of the air springs 44 regardless of load as previously described and the pressure in the springs 44 varies with the load carried by the car body and is used as a means of measuring the weight of the car body to control the extent of braking action supplied by the brake system. In order to bring this about, a line 47 communicates the air pressure of the air springs 44 with the relay air valve 38 to vary the braking effort with relatively large changes in car weight. The air spring pressure is fed to the relay air valve 38 as a control pressure and a coil spring in the valve 38 is compressed to an extent such that, when the air spring pressure falls below a predetermined value, a piston arrangement is brought into play and the air pressure passing from the relay valve 40 to the brake cylinders 43 is at a smaller value than that of the straight air pipe 21. Likewise, if the air spring pressure exceeds a predetermined value, the piston arrangement of the relay air valve 38 allows air to pass to the relay valve 40 under pressure equal to that passed through the limiting valve 36. Depending on the air pressure carried by the line 39, the pressure passed from the car reservoir 26 to the brake cylinders 43 will be at all times controlled even under emergency conditions. Consequently, the total weight of each individual car will have an effect on the amount of braking action provided each car and the braking action throughout the entire train will be substantially uniform.

Following the bringing of the train to a complete stop and upon movement of the operating handle of the brake valve 12 into brake release position, the release magnet valve portion carried by the control unit 30 is energized by the master relay valve 17 through its electrical connections in the form of wires 48 and 49 and the straight air pipe 21 is vented through the valves 17 and 30. The brake cylinders 43 are bled of air pressure by venting action of the relay valve 40 caused by differential pressure attending the reverse flow of air through the remaining parts of the system and the expelling of air pressure by the valves 17 and 30. The brakes are released to the extent desired as controlled by the positioning of the handle of the brake valve 12. During venting of the system the air pressure maintained by the air springs 44 is not affected as this air pressure is received from the supervisory line 19 and is merely used as a control in connection with the relay air valve 38 thereby being completely separate from the brake application air pressure passed through the remaining elements of the system.

Each of the cars is provided with a conductor's emergency valve 50 connected by an air line 51 to the supervisory line 19. In the event of an emergency the conductor may exhaust the supervisory line 19 by opening the valve 50 and, through the operation of the service valve 25, air is passed from the car reservoir 26 through lines 28, 29, 37 and 39 to operate the relay valve 40 thereby allowing application of air pressure from the car reservoir 26 directly to the brake cylinders 43. Upon emergency operation of the brake system, the full pressure of the car reservoir 26, as limited by the valve 36, is applied as a control in the relay valve 40 thereby allowing application of car reservoir pressure to the brake cylinders 43.

The air spring control pressure continues to operate and fast and efficient braking action is obtained.

Further conventional equipment in the brake system described in FIGS. 1 and 2 includes the use of an anti-skid control valve 52 interposed in the line 42 extending between the relay valve 40 and the brake cylinders 43. Operatively associated with the anti-skid control valve 52 is a control unit 53 which measures the rate of deceleration of the wheel and axle. If this rate exceeds 10 m.p.h. sec. the unit 53 causes the anti-skid valve 52 to release air from the brake cylinders 43 until the wheel rotational speed matches the speed of the train. A rate of deceleration exceeding 10 m.p.h./sec. is well beyond the possibility of train deceleration and the wheels begin to slip in response to braking action. However, upon the release of air pressure from the brake cylinders through the anti-skid valve 52, effective braking action will be regained.

Figure 3:
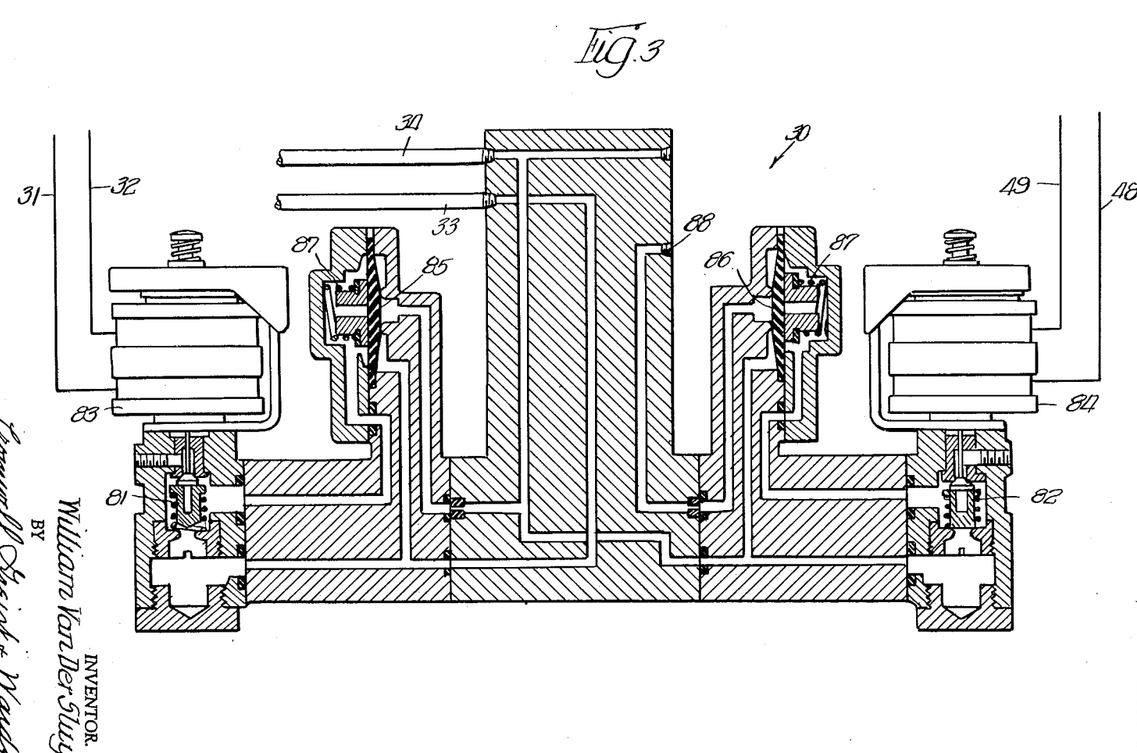
FIGS. 3–7 illustrate certain valves of the brake system of FIGS. 1 and 2 in section.

The important operational features of the application and release magnet valve 30 are illustrated in FIG. 3. This valve includes magnet valves 81 and 82 for application and release, respectively. The magnet valves 81 and 82 are operated by solenoids 83 and 84, respectively, through energization of the circuits defined by the wires 31, 32, 48 and 49 as previously described. The magnet valves 81 and 82 are normally open during periods of brake release and diaphragm valves 85 and 86 are closed by the action of coil springs 87 forming a part thereof. Upon energization of the application magnet valve 81 resulting in the closing of the same, pressurized air from the car reservoir 26 is delivered through the line 33 against the diaphragm valve 85 to open the same to permit the car reservoir pressurized air to move past the same and into the straight air pipe 21 as earlier described. With de-energization of the magnet valve 81, the spring thereof returns it to its open position permitting communication of car reservoir pressure with the rear face of the diaphragm valve 85 to close the same in cooperation with the spring 87. On the release side of the valve 30, energization of the solenoid 84 closes the release magnet valve 82 resulting in the venting of air from the rear of the diaphragm valve 86 and the resulting air pressure applied against the face of the diaphragm valve 86 opens the same to vent this portion of the brake system to the atmosphere through a vent 88.

Figure 4:
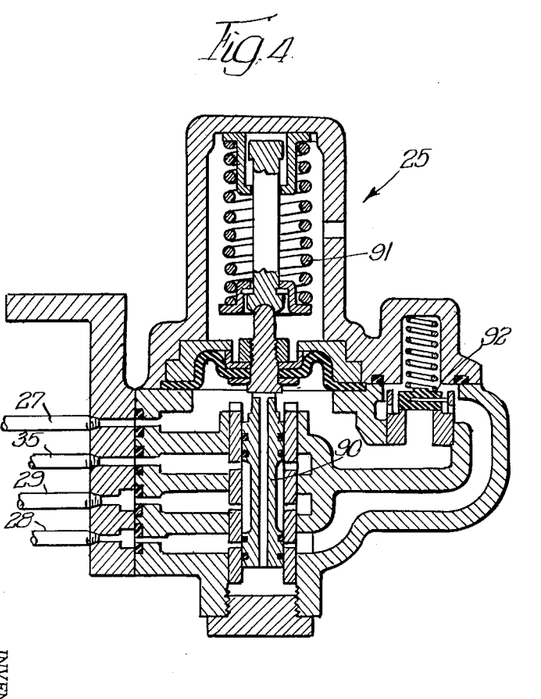

FIG. 4 illustrates in detail the service valve 25. This valve includes a spool valve 90 in an upwardly retracted position as illustrated in FIG. 4. The air pressure of the supervisory line 19 communicates with the spool valve 90 through line 27 to hold the same in an upward position against the action of its spring 91 during periods of brake release. This upward position of the spool valve 90 provides for communication between the straight air pipe 21 and the relay valve 38 through the limiting valve 36 and lines 29 and 35. Upon emergency operation of the brake system as effected by a drop in the supervisory line 19, the spring 91 overcomes remaining supervisory line air pressure and moves the spool valve 90 downwardly communicating the car reservoir 26 through the line 28 directly with the brake cylinders 43 by reason of a control pressure being transmitted through the line 29, limiting valve 36, line 37, and relay valve 40 resulting in direct opening of the car reservoir 26 through the line 41 with the brake cylinders 43. Upon operation of the brake system by energization of the application side of the valve 30, air pressure building up in the straight air pipe 21 is transmitted through the line 35, into the service valve 25 and out through the line 29 into the limiting valve and ultimately into the relay valve 40 in the manner previously described. During this operation the position of the spool valve 90 does not vary as the introduction of air into the straight air pipe 21 is controlled solely by the application side of the valve 30. The service valve 25 performs one additional function by being provided with a check valve 92 which is subjected to the air pressure of the supervisory line 19. Upn reduction in pressure in the car reservoir 26, the check valve 92 is automatically unseated and the car reservoir 26 is refilled by air delivered from the supervisory line 19 through the service valve 25 and line 28 into the car reservoir.

Figure 5:
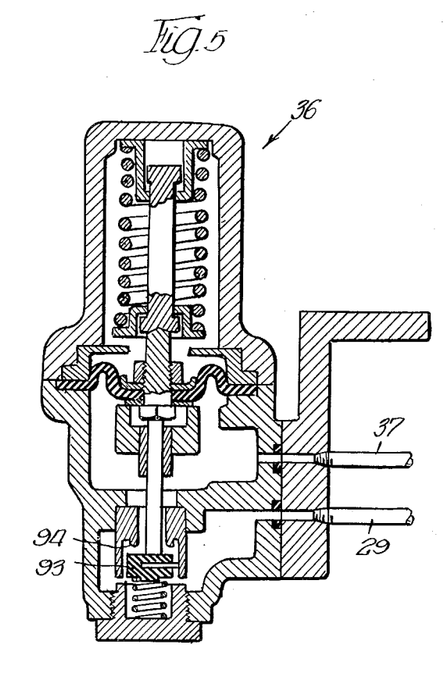

FIG. 5 illustrates the limiting valve 36. This valve is in the form of a check valve being provided with a valve element 93 which is spring urged out of engagement with a valve seat 94 as illustrated in FIG. 5. Upon operation of the brake system, the control pressure delivered through line 29 into the limiting valve 36 passes around the valve element 93 and through the valve seat 94 in an upwardly direction as viewed in FIG. 5. This air pressure then passes through line 37 into the relay valve 40 to function to communicate the air pressure in the car reservoir with the brake cylinders. As previously described, the limiting valve 36 controls the air pressure passed to the brake cylinders 43 at all times even under emergency conditions regardless of piston travel at the brake cylinders 43. The limiting pressure is about 80 p.s.i. This is merely by way of example, it being understood that excessive control pressure will not result in increasing the amount of air pressure applied to the brake cylinders 43. Actually, exceeding the predetermined force of the spring members holding the check valve 93 away from the seat 94 will result in the closing of the check valve, thus preventing excessive control pressure transmission to the relay valve 40.

Figure 6:
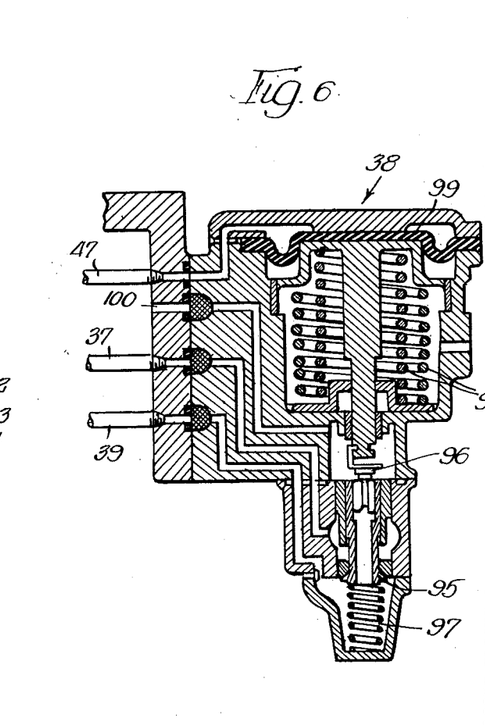

FIG. 6 illustrates the relay valve 38 which is in essence a diaphragm actuated valve responsive to air spring pressure. This valve includes a check valve 95 and a vent valve 96. The check valve 95 is normally held closed by a spring 97 whereas the vent valve 96 is normally open by action of springs 98, these positions being illustrated in FIG. 6. Air spring control pressure is communicated through line 47 against a diaphragm 99 resulting in closing the vent valve 96. Brake system operating pressure is delivered through line 37 into the relay valve 38 and where 60% braking action conditions exist, the brake system operating pressure in the valve 38 is closed off therein by the closed check valve 95. Where 100% braking action conditions exist, the air spring pressure acting against the diaphragm 99 has reached a predetermined value by reason of the heavy load on the car and still further overcomes the springs 98 with the result that further downward movement of the vent valve 96 results in the overcoming of the spring 97 and the opening of the check valve 95. Under such conditions the brake system operating pressure in the valve 38 is then placed in communication with the line 39 which in turn communicates with the valve 40. Under light load conditions, air pressure in the line 39 from the valve 38 does not build up as the same is open to the vent 100 in the valve 38.

Figure 7:
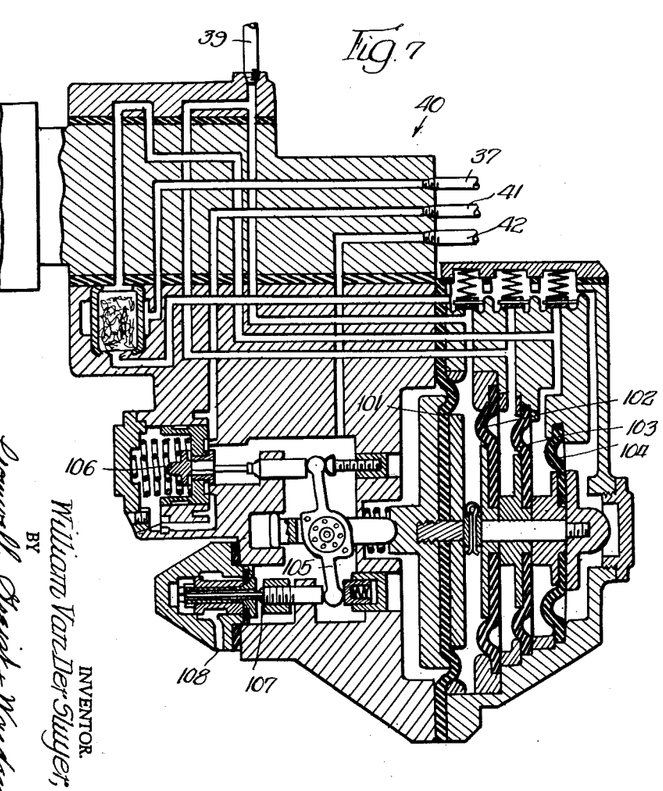

The relay valve 40 is illustrated in detail in FIG. 7. As previously described, the valve 40 communicates the car reservoir 26 with the brake cylinders 43, this communication being controlled by the supply of air transmitted through the limiting valve 36 and the relay valve 38. The valve 40 includes a plurality of pressure responsive diaphragms 101, 102, 103 and 104 of varying effective areas. These diaphragms are subjected to the balancing pressures in lines 37 and 39 when the valve 38 is open. Otherwise, as illustrated in FIG. 7, the brake operating pressure delivered to line 37 when the valve 38 is closed under 60% braking action conditions operates on certain of the diaphragms to control operation of the valve 40 as balanced by the pressure of the reservoir 26 communicating therewith through line 41. The diaphragms combine to move a connected valve stem carrying a differential element 105 which moves to the left as viewed in FIG. 7 upon brake application to open a check valve 106 and communicate air in the line 41 from the car reservoir 26 with the brake cylinders 43 through the line 42. Movement of the differential element 105 simultaneously closes a check valve 107 communicating the brake cylinder portion of the system to an atmospheric vent 108. The differential feature of operation provides for a lag in the closing of the vent 108 to regulate pressure surge through the relay valve 40. Under 100% braking action operating conditions, the valve 38 is open and brake operating pressure delivered through line 39 into valve 40 acts on additional diaphragms to permit a greater pressure transmission from the reservoir 26 through the valve 40 into the brake cylinders.

The power unit or locomotive of the train utilizing the brake system described in FIGS. 1 and 2 is also provided with the necessary valves and piping to apply the brakes carried thereby in response to the operation of the brake system. Normally, the total weight of the locomotive is substantially constant and the suspension systems utilized do not include the use of air springs. However, in the event that air springs are utilized, the pressure carried thereby does not fluctuate or vary to the extent of a passenger or freight car of the type described wherein the total passenger or freight load amounts to a large percentage of the total weight of the car. To actuate the locomotive brakes directly from the system described in FIGS. 1 and 2 it is necessary merely to utilize the air pressure of the straight air pipe 21 as increased by the main reservoir 10, and pass the same through a series of valves of the type and arrangement described in connection with the individual braking units carried by each of the cars. The primary difference residing in the braking units carried by the locomotive is that the relay air valve 38 may be eliminated as the control pressure passed to the relay valve 40 is not affected by air spring pressure. Consequently, air pressure may be passed directly from the limiting valve 36 to the relay valve 40.

In the event that the electrical controls of the system should fail to function properly, the system is adapted for straight pneumatic operation. Under such circumstances the application and release magnet valve unit 30 is out of operation and the braking pressure is built up in the straight air pipe 21 directly from the main reservoir 10. The master relay and circuit breaker valve 17 will continue its function of passing air from the main reservoir 10 into the straight air pipe even though the electrical controls forming a part thereof may be inoperative. Consequently, the increased pressure in the straight air pipe 21 will operate the service valve 25, air will pass through the limiting valve 36 and the relay air valve 38 to operate the relay valve 40 and allow air to flow from the car reservoir 26 into the brake cylinders 43. Brake release will occur as a result of the venting of air from the master relay and circuit breaker valve 17 as controlled by the brake valve 12 and subsequent venting from the relay valve 40.

If the interconnected cars should become unintentionally separated, where, for example, the brake system is utilized with conventional cars utilizing spaced wheel-carrying axles to provide completely wheel-supported cars, the accidental or unintentional separation will immediately cause the exhausting of the supervisory line 19 in each of the cars and, consequently, the braking units carried by each of the cars will be automatically applied. The system is readily adapted for use with a towing brake arrangement carried by a towing locomotive. Under such circumstances it is necessary merely to operate the system as a straight pneumatic system, the towing locomotive being provided with an air reservoir and control valve for coupling with the supervisory line. The brakes of the cars under tow may be applied by controlled venting of the supervisory line.

In the brake system of FIGS. 1 and 2, it will be noted that the air reservoirs are closely associated with the brake cylinders thereby providing instantaneous braking action when the systems are placed into operation. Consequently, the brake system is adapted for use with long trains including cars numbering as high as 150. The system is simply constructed, of light over-all weight and readily maintained. The use of air springs in supporting the car bodies relative to the wheel-carrying axles provides an air-cushioned ride thereby enhancing passenger comfort. These springs further serve to provide a control whereby the braking action applied to each car will vary according to the load condition of the car. This arrangement results in a higher pressure in the brake cylinders when the load on the air springs is increased and a lower pressure in the brake cylinders when the load on the air springs is decreased. Consequently, the braking ratio corresponds to the load.

It has been found preferable to utilize control valves, such as the relay air valve 38, which change over in response to different air pressure levels of the air springs. A considerable difference exists between the weight of a fully loaded car and an empty car and while it is possible to utilize the air spring control pressure to constantly regulate the amount of braking action obtained regardless of the degree of variation in load, it has been found adequate to provide the control valve which it responsive to the air spring pressure with two stages or levels of operation. As an example of this, reference is again made to single axle railway cars each of which is provided with a wheel-supported and a coupler-supported end.

As previously described, the suspension system including the air springs of each car carries a substantial portion of the weight of that car as well as the weight of the coupler-supported end of an adjacent car. Consequently, the variation in total weight of a single axle car is considerable. A fully loaded and coupled car is provided with 100% of its total weight whereas a coupled and unloaded car is provided with 75% of its total possible weight. Such cars when uncoupled and fully loaded have 60% of their total possible weight and when uncoupled and empty exhibit only 45% of their total possible weight. It has been found possible to utilize control means responsive to the pressure carried by the air springs which change over between 60 and 75% of the total weight of the single car. Consequently, the control valves are regulated to allow passage of full braking pressure to the brake cylinders when the total weight of the individual car falls somewhere between 60 and 75% on up. When the weight of the car is below the change-over value, the braking action of the system is reduced and is operating at the lower ratio. When using a change in ratio of this nature and designing, the change-over to occur between 60 and 75% of the total load, the braking will never be less than 75% of the heaviest load at any time. Such an arrangement has been found to be entirely adequate to provide safe and efficient operation of the train.

Referring still to single axle, lightweight railway cars, when a train is formed from these cars the endmost car, which is not connected with a locomotive or observation car, has its wheel-supported end carrying no more than 60% of its total possible load. This is due to the wheel-supported end being uncoupled and, presumably, fully loaded. Consequently, the weight on the air springs supporting this end of the train will never exceed 60% of its greatest possible weight and the braking action necessary on the endmost car is materially reduced. The air pressure carried by the air springs never exceeds a value necessary to support 60% of full weight conditions and, as a result, the control means governed by the pressure of the air springs maintains the brake system in the endmost car at a lower braking ratio. This is a particularly desirable feature as the lighter weight of the endmost car requires less braking action in bringing the same to a complete stop. Consequently, over-braking will not occur to interfere with efficient and smooth operation of the train and yet adequate braking action will always be present to insure safe operation of the train as affected by the operation of this particular car.

From the foregoing it is believed apparent that the utilization of air spring pressure of the type described greatly enhances the operation of a known form of braking system. While a two-level braking ratio has been described it should be readily apparent that a braking ratio utilizing more than two levels may be used and readily established. Many different types of braking systems may be materially improved in operation and such systems are intended to include those which operate solely by electrical controls, it not being intended to limit the present invention to application only with pneumatic or fluid pressurized brake systems.

Obviously many modifications and variations of the invention as hereinbefore set forth may be made without departing from the spirit and scope thereof, and therefore only such limitations should be imposed as are indicated in the appended claims.

I claim:

1. A brake system for a vehicle adapted for variable braking action in response to variation in vehicle operating load above and below a predetermined load, said brake system comprising a brake unit operative in response to fluid pressure, a source of fluid pressure connected to said brake unit, a first control valve means operative between said source and said brake unit to control the delivery of fluid pressure from said source to said brake unit, said first control valve means including differential pressure responsive means operative to control the value of fluid pressure supplied to said brake unit, means forming a part of said system to establish a control pressure, a normally closed second control valve means, means for delivering said control pressure to both said first and second control valve means, a first portion of the differential pressure responsive means of said first control valve means being responsive to said control pressure, and fluid pressurized vehicle load supporting spring means connected to said second control valve means and supplying a spring pressure thereto which pressure is determined by vehicle load and varies in response to variations in vehicle load, said second control valve means being connected to said first control valve means to deliver said control pressure to a second portion of the differential pressure responsive means of said first control valve means to permit the delivery of substantially increased fluid pressure to said brake unit when said spring pressure exceeds a predetermined value as a result of said vehicle operating load exceeding said predetermined load, at which value said second control valve means is fully open for control pressure delivery to said first control valve means thereby.

2. The brake system of claim 1 wherein said predetermined value of said spring pressure is related to a vehicle load of from about 60% to 75% of total vehicle load.

References Cited in the file of this patent

UNITED STATES PATENTS

| | | |
|---|---|---|
| 779,858 | Lillie | Jan. 10, 1905 |
| 1,789,750 | Hildebrand | Jan. 20, 1931 |
| 1,939,866 | Thomas | Dec. 19, 1933 |
| 2,088,185 | Borde | July 27, 1937 |
| 2,150,576 | Bell | Mar. 14, 1939 |
| 2,165,999 | Farmer | July 11, 1939 |
| 2,173,928 | Borde et al. | Sept. 26, 1939 |
| 2,184,551 | Hewitt | Dec. 26, 1939 |
| 2,919,163 | McClure et al. | Dec. 29, 1959 |
| 2,919,165 | Cotter et al. | Dec. 29, 1959 |

FOREIGN PATENTS

| | | |
|---|---|---|
| 443,625 | Germany | May 3, 1927 |

OTHER REFERENCES

"The 26 Brake Equipment for Lightweight Passenger Trains" Special Publication #9025, October 1955. Published by Westinghouse Air Brake Company, Air Brake Division (Wilmerding, Pa.). Page 3 relied on.

UNITED STATES PATENT OFFICE
CERTIFICATE OF CORRECTION

Patent No. 3,059,974            October 23, 1962

William Van Der Sluys

It is hereby certified that error appears in the above numbered patent requiring correction and that the said Letters Patent should read as corrected below.

In the grant, lines 2 and 3, for "assignor to Pullman-Standard Car Manufacturing Company, of Chicago, Illinois, a corporation of Delaware," read -- assignor to Pullman Incorporated, a corporation of Delaware, --; line 12, for "Pullman-Standard Car Manufacturing Company, its successors" read -- Pullman Incorporated, its successors --; in the heading to the printed specification, lines 4 to 6, for "assignor to Pullman-Standard Car Manufacturing Company, Chicago, Ill., a corporation of Delaware" read -- assignor to Pullman Incorporated, a corporation of Delaware --; column 7, line 75, for "Upn" read -- Upon --.

Signed and sealed this 16th day of April 1963.

(SEAL)
Attest:
ERNEST W. SWIDER
Attesting Officer

DAVID L. LADD
Commissioner of Patents